Patented Feb. 8, 1938

2,107,904

UNITED STATES PATENT OFFICE 2,107,904

PROCESS OF SEPARATING NITRILE-HYDROCARBON MIXTURES

William O. Pool, Chicago, Ill., assignor to Armour and Company, Chicago, Ill., a corporation of Illinois No Drawing. Application September 14, 1936, Serial No. 100,763

15 Claims. (Cl. 260—99.30)

This invention relates to processes of separating nitrile-hydrocarbon mixtures, such as those obtained when higher aliphatic nitriles are subjected to thermal cracking, and it comprises processes wherein such mixtures are subjected to the action of preferential solid adsorbent materials.

Processes have recently been described for the preparation of relatively low molecular weight aliphatic nitriles from nitriles of higher molecular weight. These processes include the steps of subjecting relatively high molecular weight nitriles, such as stearonitrile, palmitonitrile, and lard fatty acid nitriles to pyrolysis, which may be in the presence of a catalytic agent. These nitriles will contain from twelve to eighteen carbon atoms. The resulting products invariably consist of mixtures of lower molecular weight nitriles, such as caprylonitrile, lauronitrile, and other aliphatic nitriles having from five to ten carbon atoms, including the carbon atom of the nitrile, or CN, group. Quite large quantities of hydrocarbons are associated with the nitriles in the reaction mixture and these hydrocarbons form homogeneous solutions with the nitriles. Frequently the boiling point of the mixture is in a fairly narrow range. Constant boiling mixtures of nitriles and hydrocarbons are met with. Processes of preparing such mixtures are described in U. S. Patents 1,991,955, 2,033,536, 2,033,537, and others. With careful control during the pyrolysis it is possible to crack stearonitrile, for example, so that the cracked reaction products are limited to a single lower molecular weight nitrile, but always in association with varying amounts of aliphatic hydrocarbons.

In many relations there is no necessity for separating the nitriles from the hydrocarbons in such mixtures. But in many other instances it is desirable that the nitriles be separated from the hydrocarbons. The various individual aliphatic nitriles have quite widely separated boiling points so that from a mixture of nitriles, free of hydrocarbons, it is possible to isolate the individual nitriles by simple fractional distillation. Such common expedients are commercially unsatisfactory for the separation of the nitriles from the hydrocarbons because of the boiling point characteristics of such mixtures. The individual nitriles are substances of increasing economic importance in the arts. They can be reduced to amines. They are quite reactive chemically and can be used for the purpose of introducing alkyl radicals, having four or more carbon atoms, into organic molecules. Hence they are materials which, considered as starting materials in organic syntheses, enable the production at low cost of many of the rarer aliphatic amines, alcohols, and various derivatives thereof. The nitriles are also important addition agents in lubricants.

Consequently, although pyrolytic methods of making the nitriles are of economic significance, processes of isolating the nitriles from reaction mixtures obtained in pyrolysis are necessary adjuncts of any commercially satisfactory method of making these materials. So little has hitherto been known about them that efforts to predict successful separation processes in advance of the experiment have led to many failures.

I have now discovered that certain solid adsorbents have the surprising property of preferentially adsorbing aliphatic nitriles from liquid mixtures thereof in hydrocarbons. That there would be such preferential adsorption is quite surprising and unexpected. Just how a solid adsorbent of high surface area to volume would act upon a mixture of, for example lauronitrile and hexane, is something which cannot be predicted. Whether there would be any preferential adsorption of either constituent could only be determined by experiment. In this respect solid adsorbents such as silica gel, activated carbon, fuller's earth, activated clays, and like materials, behave in a manner analogous to catalysts since the adsorbent action is quite specific. The surprising discovery has been made that these adsorbents adsorb the nitriles rather than the hydrocarbons. This is a marked advantage since it means that in the first two, three, or four treatments of the mixture with the adsorbent the nitriles themselves will undergo preferential adsorption so that a rough separation of the nitriles themselves can also be effected if the adsorbed materials are driven from the adsorbent prior to the adsorption of further quantities of nitriles.

Thus, a nitrile-hydrocarbon mixture originally analyzing 4.09 percent nitrogen can be separated into three fractions one of which contains 8.7 percent nitrogen, another contains 2.2 percent nitrogen, and the third has but 0.008 percent nitrogen and consists essentially of the hydrocarbons. Similar results are obtained when solid preferential adsorbents like the activated carbons are used. And, as stated, many naturally occurring silicates and clays, when activated by roasting as is customary, display preferential adsorption for the nitriles.

Generally I practice the process of the present invention by simply passing the liquid nitrile-hydrocarbon mixture down through a tower packed with the solid adsorbent. Advantageously the outgoing mixture leaving the tower is recycled back to the top and the process continued until product flowing from the bottom of the tower is substantially nitrogen-free. Then the flow of fluid through the tower is stopped, the tower contents heated to a temperature of about 100-400° C. and an inert gas such as nitrogen or carbon dioxide (flue gas) passed through. This desorbs the adsorbed material and vapors leaving the top of the tower are condensed. The condensate comprises the nitriles in the original starting mixture.

One important modification of the above process consists in desorbing after each pass of the mixture through the adsorbent-packed tower. When this is done the nitriles obtained are already roughly separated into fractions. Apparently the lowest molecular weight nitriles are adsorbed first since the nitrogen content of the condensate obtained after a single cycle of adsorbing, desorbing, and condensing the vapors driven from the adsorbent, has a higher nitrogen content than condensates recovered in subsequent cycles. This, in itself is a marked advantage.

After extended use of the adsorbent, lessening of adsorption power may be noticed. Reactivation is a simple matter. The various activated clays, silica gel, and the like can be reactivated by burning out any organic matter at a temperature of about 600° C. In other words, the adsorbent is rotated in air at this temperature.

Of the many adsorbents available for use in my process I find that silica gel has many advantages not possessed by the naturally occurring silicates. Silica gel can be prepared so that the product is uniform, has uniform particle size, and has high adsorption power. Its reactivation can be done quickly, and it is hard enough to withstand packing in the usual adsorption towers. Consequently I shall describe my invention specifically with reference to this material.

For example, I start with 100 parts by volume of a nitrile-hydrocarbon mixture having a boiling range of 180° C. to 200° C. This mixture is obtained from cracking stearonitrile and it contains hydrocarbons having ten, eleven, and twelve carbon atoms, and aliphatic nitriles having seven, eight and nine carbon atoms including that in the CN radical. This mixture is passed seven times over 51.8 parts by volume of silica gel, or similar activated silica. After each passage the silica gel is desorbed by heating to about 100-400° C. in a current of nitrogen and the condensable vapors recovered. After seven cycles of adsorption and desorption the condensate amounts to 46.1 parts by volume and has a nitrogen content of 8.7 percent. The unadsorbed hydrocarbons amount to 65.5 parts by volume and have a nitrogen content of but 0.008 percent. The recovered volumes, it will be noted, exceed 100. When mixtures of nitriles and hydrocarbons are mixed a diminution in volume is observed. Thus, one part of nitriles and one part of hydrocarbons, when mixed, yield less than two parts of mixture. The hydrocarbons separated in the above-described manner are quite complex and doubtless consist of many different isomeric aliphatic hydrocarbons having the carbon atoms stated.

During the course of the adsorption and desorption the silica undergoes a change in color and becomes quite dark. After about two volumes of nitrile-hydrocarbon mixture have been treated with one volume of silica gel the silica gel begins to lose its effectiveness. By this I mean that, after repeated adsorptions and desorptions of two volumes of nitrile-hydrocarbon mixture so as to separate the nitriles therefrom, one volume of silica displays lessened activity. Naturally two volumes of mixture can be recycled as many times as desired through the one volume of silica before regeneration is necessary. It is the ratio of nitrile mixture to silica gel which governs regeneration and not the number of times the mixture has been recycled.

When reactivation or regeneration is necessary this can be accomplished readily by roasting in the air at temperatures of about 600° C.

The efficiency of silica gel as a preferential adsorbent in my process is surprising. For example, it will completely remove lauronitrile from a 1.7 percent solution thereof in hydrocarbons.

In the appended claims I designate the adsorbent material as one which has a preferential adsorption for nitriles. Such materials include silica, alumina, silicate clays, activated carbon, and the like. Since I am the first to describe ways of separating nitriles from hydrocarbons by the use of solid adsorbents, and the first to discover that such materials will preferentially adsorb the nitriles, I wish to claim my invention broadly.

Having thus described my invention what I claim is:

1. The process of separating liquid mixtures composed of aliphatic nitriles and liquid aliphatic hydrocarbons which comprises subjecting said liquid mixture to the action of a solid adsorbent having the property of preferentially adsorbing the nitriles from the liquid mixture, and then recovering the adsorbed nitriles from said adsorbent.

2. The process as in claim 1 wherein the nitrile-hydrocarbon mixture is that obtained by the pyrolysis of higher fatty acid nitriles having from twelve to eighteen carbon atoms.

3. The process of separating liquid mixtures composed of aliphatic nitriles and liquid aliphatic hydrocarbons which comprises subjecting said liquid mixture to the action of a silica-containing solid adsorbent having the property of preferentially adsorbing the nitriles from the liquid mixture, and then recovering the adsorbed nitriles from said adsorbent.

4. The process as in claim 3 wherein the nitrile-hydrocarbon mixture is that obtained by the pyrolysis of higher fatty acid nitriles having from twelve to eighteen carbon atoms.

5. The process as in claim 3 wherein the adsorbent is silica gel.

6. The process as in claim 3 wherein the nitrile-hydrocarbon mixture is that obtained by the pyrolysis of higher fatty acid nitriles having from twelve to eighteen carbon atoms and the adsorbent material is silica gel.

7. The process of separating liquid mixtures composed of aliphatic nitriles and liquid aliphatic hydrocarbons which comprises subjecting said liquid mixture to the action of a solid adsorbent having the property of preferentially adsorbing the nitriles from the liquid mixture, distilling the adsorbed nitriles therefrom, and condensing the distilled nitrile vapors.

8. The process as in claim 7 wherein the nitrile-hydrocarbon mixture is that obtained by the pyrolysis of higher fatty acid nitriles having from twelve to eighteen carbon atoms.

9. The process of separating liquid mixtures composed of aliphatic nitriles and liquid aliphatic hydrocarbons which comprises subjecting said liquid mixture to the action of a silica-containing solid adsorbent having the property of preferentially adsorbing the nitriles from the liquid mixture, distilling the adsorbed nitriles therefrom, and condensing the distilled nitrile vapors.

10. The process as in claim 9 wherein the nitrile-hydrocarbon mixture is that obtained by the pyrolysis of higher fatty acid nitriles having from twelve to eighteen carbon atoms.

11. The process as in claim 9 wherein the adsorbent is silica gel.

12. The process as in claim 9 wherein the nitrile-hydrocarbon mixture is that obtained by the pyrolysis of higher fatty acid nitriles having from twelve to eighteen carbon atoms and the adsorbent material is silica gel.

13. The process of separating liquid mixtures composed of aliphatic nitriles and liquid aliphatic hydrocarbons which comprises subjecting said liquid mixture to the action of a solid adsorbent having the property of preferentially adsorbing nitriles from the liquid mixture, recovering adsorbed nitriles therefrom, contacting the liquid mixture again with the adsorbent, recovering further quantities of adsorbed nitriles therefrom, and repeating said cycle of adsorption and desorption until substantially all nitriles in the original liquid mixture have been separated therefrom.

14. The process as in claim 13 wherein the adsorbent is silica gel.

15. The process as in claim 13 wherein the adsorbent is silica gel and the nitrile-hydrocarbon mixture is that obtained by the pyrolysis of fatty acid nitriles having from twelve to eighteen carbon atoms.

WILLIAM O. POOL.